Patented Apr. 24, 1951

2,549,921

UNITED STATES PATENT OFFICE 2,549,921

POLYMERIZATION OF VINYL ALKYL ETHERS WITH ALUMINUM HEXA-HYDROSULFATE

Samuel A. Mosley, St. Albans, W. Va., assignor, by mesne assignments, to Union Carbide and Carbon Corporation, a corporation of New York No Drawing. Application September 13, 1949, Serial No. 115,547

7 Claims. (Cl. 260—91.1)

This invention relates to the polymerization of vinyl alkyl ethers to form tough, rubbery polymers of high molecular weight.

Polymeric vinyl alkyl ethers of high molecular weight have heretofore been prepared only by polymerization of highly pure monomers at extremely low temperatures. Such polymers have also been prepared at moderately reduced polymerization temperatures but only in the presence of gallium trichloride, a rare and expensive material.

According to this invention, vinyl alkyl ethers are polymerized to solid polymers by using aluminum hexahydrosulfate ($Al_2(SO_4)_3 \cdot 3H_2SO_4$) as the catalyst. This catalyst may be prepared in a pure or dilute condition by heating aluminum sulfate, usually the hydrated salt of commerce ($Al(SO_4)_3 \cdot 18H_2O$), with from 5 to 100% of the theoretical amount of sulfuric acid required to form the hexahydrosulfate complex salt of the empirical formula given above. When used in the diluted state, the complex salt is the active ingredient of the catalyst, as experiments showed that vinyl alkyl ethers do not polymerize in the presence of aluminum sulfate alone. When 5% of concentrated sulfuric acid was added to the aluminum sulfate without heating and the mixture used as a catalyst for the polymerization of vinyl alkyl ethers, the ethers were hydrolyzed and only slightly polymerized.

The amount of the aluminum hexahydrosulfate required to catalyze the polymerization of the vinyl alkyl ethers is not critical, the useful range being 0.001 to 5% by weight of the monomer. The preferred concentration of the catalyst is 0.005 to 0.5% by weight of the vinyl ether.

The vinyl alkyl ethers which are polymerized to solid polymers by the improved catalyst of this invention are of the general type $$CH_2=CHOR$$

where R is an alkyl radical, such as a methyl, ethyl, propyl, isopropyl, butyl, isobutyl, 2-ethylbutyl, 2-ethylhexyl, or lauryl radical. One of the merits of the present invention is that the vinyl ethers used need not be of high purity in order to obtain solid polymers of high molecular weight; good results having been obtained with vinyl ether monomers of 95% purity. However, to obtain products having the highest molecular weight and the least color, it is desirable to start with vinyl ether monomers of high purity. Furthermore, the aluminum hexahydrosulfate catalyst of this invention is equally effective in promoting the polymerization when one of the usual antioxidant stabilizers for the polymer is added to the vinyl ethers prior to polymerization. Also, mixtures of two or more of the vinyl alkyl ethers may be copolymerized to obtain polymers having properties different from the homopolymers obtained by polymerizing one of the components of the mixture by itself.

The polymerization of the vinyl alkyl ethers proceeds readily upon mixing the ethers with the aluminum hexahydrosulfate catalyst at temperatures of 10° C. or lower to room temperature, but the rate of polymerization may be increased by heating. A remarkable fact about the catalyst of this invention is that solid polymers of high molecular weight are obtained even though the polymerization is conducted at elevated temperatures in the range of 30° to 120° C. The polymerization of the vinyl alkyl ethers in the presence of the aluminum hexahydrosulfate may be carried out in the absence of diluents, but the reaction is quite vigorous and, on an industrial scale, effective means for removing the heat of the reaction should be provided. In order to moderate the reaction and to facilitate removal of the polymer from the reaction vessel, the polymerization is desirably carried out in the presence of an inert organic diluent, such as an aliphatic or aromatic hydrocarbon, a chlorinated aliphatic hydrocarbon, or an aliphatic ether. When the diluent selected is one which boils at or below the polymerization temperature, control of the reaction is readily obtained by evaporating part of the diluent to remove the heat of reaction, and returning the condensed diluent as reflux. Upon completion of the polymerization in such instances, the polymer is obtained as a viscous solution which may be used as such, or from which the polymer may be recovered by evaporation of the diluent or by precipitation of the polymer by the addition of a non-solvent to the solution. The isolated polymers are tough, rubbery materials having considerable elastic extensibility on stretching. They form valuable adhesives, coatings and films.

The following examples will serve to illustrate the invention:

*Example 1.—Preparation of 75% aluminum hexahydrosulfate*

Two hundred (200) grams of aluminum sulfate octadecahydrate ($Al_2(SO_4)_3 \cdot 18H_2O$) were dissolved in a small quantity of water, and 66 grams of concentrated sulfuric acid (75% of the theoretical amount) were added to this solution. The solution was evaporated to dryness without fuming, and the residue heated in an oven at 170° C. for four hours. Instead of using an aqueous solution of the aluminum sulfate, the finely ground salt may be heated with sulfuric acid in like manner. The complex salt formed may be termed aluminum hexahydrosulfate and exists as the heptahydrate $(Al_2(SO_4)_3 \cdot 3H_2SO_4 \cdot 7H_2O)$.

The catalyst is unstable to water and quite hygroscopic. It should be stored in a dry condition out of contact with the atmosphere until ready for use.

Example 2.—Preparation of 5% aluminum hexahydrosulfate

Two hundred (200) grams of aluminum sulfate octadecahydrate were heated with 4.4 grams of concentrated sulfuric acid (5% of theoretical amount) for four hours at 140° C.

Example 3.—Preparation of pure aluminum hexahydrosulfate heptahydrate (aluminosulfuric acid)

Two hundred (200) grams of aluminum sulfate octadecahydrate were added to eighteen hundred (1800) grams of cold concentrated sulfuric acid to form a slurry. Upon warming to 80° C. a voluminous white precipitate separated. Upon cooling, diluting with two liters of ethyl ether, filtering and washing the filter cake with ether, the complex salt was obtained as a white powder which decomposes in moist air and dissolves in water. Such solutions hydrolyze to aluminum sulfate and sulfuric acid.

For other details of the preparation of these complex acid salts see R. Silberberger, Monatshefte, 25–2207 (1904). It is understood that the term "aluminum hexahydrosulfate" includes the hydrates of this complex salt among which are reported the heptahydrate (Silberberger) and dodecahydrate (Henry and King, J. A. C. S. 71, 1142 (1949)).

Example 4.—Polymerization of vinyl ethyl ether

To a flask equipped with a stirrer and reflux condenser were added 90 parts by weight of vinyl ethyl ether and 170 parts of pentane, and the solution heated to reflux (32° C.). The catalyst of Example 1 (0.009 part by weight) was added to the refluxing mixture whereupon polymerization commenced immediately, the mixture becoming a thick gel in about 50 minutes.

The gel was diluted with additional pentane and 0.5–1.0% of an antioxidant stabilizer was added, for instance, phenyl alphanaphthylamine. Ammonia gas was bubbled through the solution to neutralize the catalyst. The solution was filtered and evaporated to dryness, first in a steam bath and then in an oven at 120° C. for one hour.

The solid polymer was recovered in a 90% yield on the monomer and was a tough, rubbery, extensible material having a reduced viscosity of 4.7.

The reduced viscosity is the specific viscosity of 0.5000 gram of polymer in 100 ml. of benzene divided by the concentration in grams per 100 ml. of solvent, and thus numerically equal to twice the specific viscosity. The specific viscosity is the (viscosity of solution/viscosity of the solvent) −1.

Example 5.—Polymerization of vinyl ethyl ether

The process of Example 4 was repeated, substituting, however, 0.06 part by weight of the catalyst of Example 2. Because of the reduced concentration of the catalyst, the reaction did not begin until four hours, and required four additional hours for the polymerization to proceed to 33% conversion, external heating being required to maintain the reflux.

Five ml. of 0.5 N alcoholic KOH was added to neutralize the catalyst and 0.5% of phenyl alphanaphthylamine was added. The polymer, which was recovered as in Example 4, had a reduced viscosity of 4.5.

Example 6.—Polymerization of vinyl ethyl ether

To a flask equipped with a stirrer and a reflux condenser were charged 90 parts by weight of vinyl ethyl ether, 170 parts of pentane and 0.45 part of butylated hydroxyanisole (an antioxidant type stabilizer having an acid reaction). The mixture was heated to boiling (32° C.) and 0.009 part of the catalyst of Example 1 were added with stirring. After about five minutes, the solution became more viscous, whereupon the viscosity increased rapidly accompanied by foaming and extensive reflux without external heating. After about twenty minutes, the reflux subsided and a very viscous, colorless to pale yellow gel remained.

The gel was diluted with several volumes of pentane, and gaseous ammonia was bubbled in for several minutes to neutralize the catalyst. The solvent was removed by heating in a steam bath, followed by further drying in an oven at 120° C. The polymer was obtained in 90% yield as a tough, rubbery, extensible product having a reduced viscosity of 10, indicating its high molecular weight.

Example 7.—Polymerization of vinyl n-butyl ether

This ether (200 parts) was polymerized in toluene (200 parts) solution according to the procedure of Example 6. The polymerization temperature was 105° C., the time required for polymerization was 50 minutes, the yield was 93%, and the reduced viscosity of the resin was 1.6.

Example 8.—Polymerization of vinyl isopropyl ether

This ether (90 parts) was polymerized in 170 parts of a mixture of 50 parts of benzene and 280 parts of pentane according to the procedure of Example 6. The polymerization temperature was 38° C. The time required for polymerization was 120 minutes, the yield was 90%, and the reduced viscosity of the polymer was 5.4.

Example 9.—Copolymerization of vinyl ethyl and vinyl isopropyl ethers

Fifteen (15) parts of vinyl isopropyl ether, seventy-five (75) parts by weight of vinyl ethyl ether, 170 parts of pentane, and 0.45 part of butylated hydroxyanisole were charged to a reaction vessel and heated to reflux. Then 0.009 part by weight of the catalyst of Example 1 was added, and the polymerization continued for 120 minutes. At the end of this time the copolymer was obtained in 90% yield based on the monomers charged. The copolymer had a reduced viscosity of 4.7.

Example 10.—Polymerization of vinyl n-butyl ether

This ether (90 parts) was polymerized in pentane (170 parts) according to the procedure of Example 6 but using the catalyst of Example 3 (0.002 part). The polymerization temperature was 40° C., the time required for polymerization was 60 minutes, the yield was 94.5% and the reduced viscosity of the resin was 6.3.

*Example 11.—Polymerization of vinyl n-propyl ether*

This ether (90 parts) was polymerized in pentane (170 parts) and 0.45 part of butylated hydroxyanisole according to the procedure of Example 6 but using the catalyst of Example 3 (0.002 part). The polymerization temperature was from 35 to 40° C. The time required for polymerization was 30 minutes. The yield of polymer was 95 per cent and the reduced viscosity of the resin was 5.92.

*Example 12.—Polymerization of vinyl isobutyl ether*

This ether (90 parts) was polymerized in pentane (170 parts) and 0.45 part of butylated hydroxyanisole according to the procedure of Example 6 but using the catalyst of Example 3 (0.006 part). The polymerization temperature was from 35 to 40° C.—maintained with a warm water bath throughout the two-hour reaction period. The yield was 94.5 per cent of tough, elastic material having a reduced viscosity of 3.62.

*Example 13.—Polymerization of vinyl 1,3-dimethylbutyl ether*

This ether (90 parts) was polymerized in pentane (170 parts) according to the procedure of Example 12. The polymerization temperature was 35 to 40° C., maintained with warm water. The time required was two hours. The yield of polymer was 83 per cent and the reduced viscosity of the resin was 1.17.

Modifications of the invention other than as specifically set forth in the foregoing examples are within the scope of the invention as defined in the appended claims.

What is claimed is:

1. In the polymerization of vinyl alkyl ethers to solid polymers, the improvement which comprises carrying out the polymerization under substantially anhydrous conditions in the presence of aluminum hexahydrosulfate as a catalyst.

2. Process of converting vinyl alkyl ethers to tough, elastic solids which comprises polymerizing the vinyl ethers at a temperature of 10° to 120° C. in the presence of a liquid hydrocarbon boiling below 120° C. and in the presence of 0.001 to 5% by weight of the vinyl ethers of aluminum hexahydrosulfate.

3. Process as claimed in claim 2 in which the vinyl ether is vinyl ethyl ether.

4. Process as claimed in claim 2 in which the vinyl ether is vinyl isopropyl ether.

5. Process as claimed in claim 2 in which the vinyl ether is vinyl n-butyl ether.

6. Process as claimed in claim 2 in which the vinyl ether is vinyl isobutyl ether.

7. Process as claimed in claim 2 in which the vinyl ether is vinyl n-propyl ether.

SAMUEL A. MOSLEY.

REFERENCES CITED

The following references are of record in the file of this patent:

UNITED STATES PATENTS

| Number | Name | Date |
|---|---|---|
| 2,104,000 | Reppe et al. | Dec. 28, 1937 |

FOREIGN PATENTS

| Number | Country | Date |
|---|---|---|
| 836,721 | France | Jan. 25, 1939 |